United States Patent [19]
Brock et al.

[11] Patent Number: 5,635,559
[45] Date of Patent: Jun. 3, 1997

[54] WATER-BASED PHYSICALLY DRYING COATING AGENTS, MANUFACTURE AND USE THEREOF

[75] Inventors: Thomas Brock, Hürth; Hans-Peter Patzschke, Wuppertal; Fritz Sadowski, Pulheim, all of Germany

[73] Assignee: Herberts Gesellschaft mit Beschrankter Haftung, Germany

[21] Appl. No.: 544,855

[22] Filed: Oct. 18, 1995

Related U.S. Application Data

[63] Continuation of Ser. No. 205,142, Mar. 1, 1994, abandoned, which is a continuation of Ser. No. 877,550, May 1, 1992, abandoned.

[30] Foreign Application Priority Data

May 18, 1991 [DE] Germany ............... 41 15 015.5

[51] Int. Cl.⁶ ........................................................ C08J 3/02
[52] U.S. Cl. ...................... 524/839; 524/845; 524/591; 528/76; 528/79; 528/80
[58] Field of Search .......................... 524/839, 845, 524/591; 528/76, 79, 80

[56] References Cited

U.S. PATENT DOCUMENTS

| | | | |
|---|---|---|---|
| 4,558,090 | 12/1985 | Drexler et al. | 524/591 |
| 5,141,987 | 8/1992 | Nachtkamp et al. | 524/591 |

*Primary Examiner*—James J. Seidleck
*Assistant Examiner*—Duc Truong
*Attorney, Agent, or Firm*—Fitch, Even, Tabin & Flannery

[57] ABSTRACT

The description relates to physically drying water-based coating agents. They contain water, metallic pigments, optional other pigments, neutralizing agents, conventional additives, small proportions of solvents and a binder mixture consisting of A) 50 to 90 wt. % polyurethanes with carbonate groupings and a number average molecular weight of 70000 to 500000 based on reaction products of polyisocyanates with polyhydroxyl compounds, with a content of polyhydroxy polycarbonates and B) 10 to 50 wt. % of carboxylic acid ester groups containing polyurethanes with a number average molecular weight of 20000 to 100000.

They are particularly suitable for manufacturing metallic lacquers for repairs in the motor vehicle sector.

19 Claims, No Drawings

WATER-BASED PHYSICALLY DRYING COATING AGENTS, MANUFACTURE AND USE THEREOF

This application is a continuation of application Ser. No. 08/205,142, filed Mar. 1, 1994, now abandoned, which is a Continuation of U.S. application Ser. No. 07/877,550, Filed May 1, 1992, now abandoned.

The invention relates to physically drying water-based coating agents, suitable more particularly for manufacture of metallic coatings.

Aqueous coating agents are known in the manufacture of base layers of multi-layer coatings. For example, EP-A-0 089 497 (U.S. Pat. No. 4,489,135) describes water-dilutable coating agents based on polyurethane dispersions produced by a known process of building up from polyether and/or polyester diols, diisocyanates, compounds with two groups reacting with isocyanate and at least one anionic group, and di- and/or polyamines. These coating agents, optionally after covering with a coating lacquer, are stoved at elevated temperature, e.g. 130° to 150° C.

In industry and trade, there is also a need for physically drying coating agents suitable particularly for patching the lacquer on various substrates such as metal objects, more particularly in the motor vehicle sector, or for lacquering machines. The coating agents required for this purpose must dry or harden at room temperature or on slight heating, e.g. up to 60° C.

These physically drying coating agents, suitable e.g. for patching the lacquer on motor vehicles, are known e.g. from DE-PS 29 24 632. The known systems, however, are not water-based but based on organic solvents.

The aim of the invention is to provide a water-based physically drying coating agent.

It has been shown that this problem can be solved by the subject of the invention, which contains 8 to 30 wt. % of a binder, i.e. a mixture of
- A) 10 to 90 wt. %, preferably 50 to 90 wt. %, of one or more polyurethanes containing carbonate groupings and with a number average molecular weight (Mn) of 70000 to 500000, in the form of an aqueous dispersion, and
- B) 10 to 90 wt. %, preferably 10 to 50 wt. %, of one or more polyurethanes containing carboxylic acid ester groups and having a number average molecular weight (Mn) of 20000 to 100000, in the form of an aqueous dispersion, the percentages by weight of components A) and B) each relating to the binder solids and adding up to 100 wt. %, 50 to 85 wt. % water, 1 to 20 wt. % of one or more solvents, 0.3 to 4 wt. % of one or more metallic pigments, 0 to 10 wt. % of one or more colouring and/or decorative pigments, neutralising agents to obtain a degree of neutralisation of 40 to 120% in the neutralisable groups of the binder, and optional conventional additives and adjuvants, the binder component A) being obtainable by reaction of
- a) 10 to 40 wt. % of one or more organic polyisocyanates not containing any hydrophilic groups or groups convertible into hydrophilic groups,
- b) 40 to 80 wt. % of one or more higher-molecular organic polyhydroxyl compounds containing no hydrophilic groups or groups convertible into hydrophilic groups and containing at least 50 wt. % of one or more polyhydroxy polycarbonates,
- c) 0 to 18 wt. % of water and/or one or more low-molecular compounds containing at least two groups which react with isocyanate groups but not containing any hydrophilic groups or groups convertible into hydrophilic groups,
- d) 0 to 8 wt. % of one or more non-ionic hydrophilic compounds containing at least one isocyanate group or at least one group capable of reacting with isocyanate groups, and
- e) 1 to 12 wt. % of one or more compounds containing at least one ionic group or at least one group convertible into an ionic group and at least one hydrogen atom capable of reacting with isocyanate groups, and the binder component B) being obtainable by reacting
- f) 10 to 40 wt. % of one or more organic polyisocyanates containing no hydrophilic groups or groups convertible into hydrophilic groups,
- g) 40 to 80 wt. % of one or more higher-molecular organic polyhydroxyl compounds containing no hydrophilic groups or groups convertible into hydrophilic groups,
- h) 0 to 18 wt. % of water and/or one or more low-molecular compounds containing at least two groups capable of reacting with isocyanate groups but not containing any hydrophilic groups or groups convertible into hydrophilic groups,
- i) 0 to 8 wt. % of one or more non-ionic hydrophilic compounds containing at least one isocyanate group or at least one group which reacts with isocyanate groups, and
- j) 1 to 12 wt. % of one or more compounds containing at least one ionic group or at least one group convertible into an ionic group and at least one hydrogen atom capable of reacting with isocyanate groups.

In the coating agents according to the invention, the binder component A) is one or more polyurethanes containing carbonate groupings. These polyurethanes may optionally also contain urea groupings, the resulting substances being polyurethane ureas.

Preferably the polyurethanes used as component A) contain at least 200 milliequivalents per 100 g solids of chemically incorporated —O—CO—O— carbonate groups. Preferably they contain not more than a total of 320 milliequivalents per 100 g solids of chemically incorporated —NH—CO—O— urethane groupings and optionally chemically incorporated —NH—CO—NH— urea groupings. Examples of suitable polyurethanes of this kind are described in German patent application 39 36 794.0 (U.S. Pat. No. 5,141,987) dated 4 Nov. 1989.

The component A) of the coating agents according to the invention is obtainable by reacting the previously-defined components a), b), c), optionally d), and e). Component a) is used in a proportion of 10 to 40 wt. %, preferably 15 to 35 wt. %, in each case related to the solid content of component A). The organic polyisocyanates used can typically be multifunctional isocyanates, such as aliphatic polyisocyanates, cycloaliphatic polyisocyanates and/or polyisocyanates containing aromatic groups, in which the isocyanate functions are preferably bonded to aliphatic groups. The polyisocyanates have on average more than one, preferably at least two isocyanate groups per molecule and a molecular weight of 112 to 1000, preferably 140 to 400. The functional group therein is preferably two isocyanate groups symmetrically or asymmetrically disposed in the molecule. Isomers or isomer mixtures of organic diisocyanates are preferred. Tetramethyl xylylene diisocyanate is an example of a diisocyanate containing aromatic groups.

Owing to their good resistance to ultraviolet light, (cyclo) aliphatic diisocyanates yield products with low tendency to yellowing. The following are examples: isophorone diisocyanate, cyclopentylene diisocyanate, and the hydrogenation products of aromatic diisocyanates, e.g. cyclohexylene diisocyanate, methyl cyclohexylene diisocyanate and dicyclohexylmethane diisocyanate. Aliphatic diisocyanates are compounds having the formula:

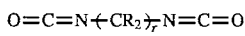

where r is an integer from 2 to 20, preferably 6 to 8, and R, which can be the same or different, denotes hydrogen or a low alkyl radical with 1 to 8 C-atoms, preferably 1 or 2 C-atoms. The following are examples thereof: trimethylene diisocyanate, tetramethylene diisocyanate, pentamethylene diisocyanate, hexamethylene diisocyanate, propylene diisocyanate, ethyl ethylene diisocyanate, dimethyl ethylene diisocyanate, methyl trimethylene diisocyanate and trimethyl hexane diisocyanate. Isophorone diisocyanate and dicyclohexyl methane diisocyanate are particularly preferred. The polyisocyanate components for forming the prepolymers can also contain a proportion of higher-valency polyisocyanates, provided they are not affected by yellowing. Good results have been obtained with triisocyanate products obtained by trimerisation or oligomerisation of diisocyanates or by reaction of diisocyanates with polyfunctional compounds containing OH or NH groups. Examples thereof are the biuret of hexamethylene diisocyanate and water, the isocyanurate of hexamethylene diisocyanate or the adduct of isophorone diisocyanate to trimethylol propane.

The average functionality can optionally be lowered by adding monoisocyanates. Phenyl isocyanate, cyclohexyl isocyanate and stearyl isocyanate are examples of such chain-breaking monoisocyanates.

The component b) used for producing the binder component A) is used in quantities of 40 to 80 wt. %, preferably 45 to 75 wt. %, in each case relative to the total solids in component A). Component b) preferably comprises an organic polyhydroxyl compound having a molecular weight of 300 to 5000, preferably 500 to 3000, the component b) containing at least 50 wt. %, preferably more than 70 wt. % of polyhydroxypolycarbonates in this molecular weight range. These structural components essential to the invention include esters of carbonic acid obtained by reaction of carbonic acid derivatives, such as diphenyl carbonate or phosgene, with diols. Examples of such diols are ethylene glycol, 1,2 and 1,3-propanediol, 1,4 and 1,3-butanediol, 1,6-hexanediol, 1,8-octanediol, neopentyl glycol, 1,4-bishydroxymethyl cyclohexane, 2-methyl-1,3-propanediol, 2,2,4-trimethyl-1,3-pentanediol, diethylene glycol, tri- and tetraethylene glycol, dipropylene glycol, polypropylene glycols, dibutylene glycol, polybutylene glycols, bisphenol A and tetrabromobisphenol A. Preferably the diol component contains 40 to 100 wt. % hexanediol, preferably 1,6-hexanediol, and/or hexanediol derivatives, preferably those containing terminal OH groups and also ether or ester groups, e.g. products obtained by reacting 1 mol hexanediol with at least 1 mol, preferably 1 to 2 mols of caprolactone as per DE-AS 17 70 245 (U.S. Pat. No. 3,640,967), or by etherification of hexanediol with itself to form di- or tri-hexylene glycol. The production of these derivatives is known e.g. from DE-AS 1 570 540. The polyether polycarbonate diols described in DE-OS 37 17 060 (U.S. Pat. No. 4,808,691) may also very advantageously be used. The hydroxyl polycarbonate should be basically straight-chain, but if required they can easily be branched by incorporating polyfunctional components, more particularly low-molecular polyols. The following are examples of suitable substances: glycerol, trimethylol propane, 1,2,6-hexanetriol, 1,2,4-butanetriol, trimethylol propane, pentaerythritol, quinitol, mannitol and sorbitol, methyl glycoside and 1,4,3,6-dianhydrohexitols.

In addition to these polyhydroxypolycarbonates, the structural component b) can contain other polyhydroxyl compounds known from polyurethane chemistry and in the aforementioned molecular-weight range, e.g.

1. Dihydroxypolyesters of dicarboxylic acids known in polyurethane chemistry, e.g. succinic acid, adipic acid, suberic acid, azelaic acid, sebacic acid, phthalic acid, isophthalic acid, terephthalic acid, tetrahydrophthalic acid etc and diols, e.g. ethylene glycol, 1,2-propanediol, 1,3-propanediol, diethylene glycol, 1,4-butanediol, 1,6-hexanediol, 1,8-octanediol, neopentyl glycol, 2-methyl 1,3-propanediol or the various isomeric bishydroxy methyl cyclohexanes;
2. Polylactones known in polyurethane chemistry, e.g. polymers of ε-caprolactone started on the aforementioned divalent alcohols;
3. Polyethers known in polyurethane chemistry, e.g. polymers or copolymers of tetrahydrofuran produced by using divalent starter molecules such as water or the aforementioned diols or amines containing 2 NH bonds, or styrene oxide, propylene oxide, ethylene oxide, butylene oxide or epichlorohydrin, more particularly propylene oxide and optionally ethylene oxide. Optionally ethylene oxide may also be added in proportions, but provided that the resulting polyether diol does not contain more than 10 wt. % of ethylene oxide units.

Preferably also, the polyether diols used are obtained without using ethylene oxide, more particularly by exclusive use of propylene oxide and tetrahydrofuran.

Component c) can optionally be used in the production of the binder component A). If so, it is used preferably in quantities of 0.2 to 18 wt. %, particularly preferably from 0.5 to 10 wt. % relative to the solid content of component A). The optional component c) comprises low-molecular compounds known from polyurethane chemistry, containing at least difunctional hydroxyl and/or amino groups and having a molecular weight of 60 to 400. The compounds c) are used to prolong the chain during addition of isocyanates (when difunctional compounds are used) or as cross-linking agents (when trifunctional or multifunctional compounds are used) and are so constructed that the functional groups are bonded via aliphatic, alicyclic or aromatic radicals. For example, quantities up to 30 wt. % of the total polyol constituents, preferably about 2 to 20 wt. %, can be used. Examples of suitable low-molecular polyols and polyamines are given hereinafter.

Preferably the low-molecular polyols have up to about 20 carbon atoms in the molecule, e.g. ethylene glycol, diethylene glycol, triethylene glycol, 1,2-propanediol, 1,3-propanediol, 1,4-butanediol, 1,2-butylene glycol, 1,6-hexanediol trimethylol propane, castor oil or hydrogenated castor oil, di-trimethylol propane ether, pentaerythritol, 1,2-cyclohexanediol, 1,4-cyclohexane dimethanol, bisphenol A, bisphenol F, neopentyl glycol, hydroxypivalic acid neopentyl glycol ester, hydroxyethylated or hydroxypropylated bisphenol A, hydrogenated bisphenol A and mixtures thereof.

The polyamines are basically alkylene polyamines with 1 to 30 carbon atoms, preferably about 2 to 12 carbon atoms. They can bear substituents not containing any hydrogen atoms capable of reacting with isocyanate groups. The following are examples: polyamines with straight or branched aliphatic, cycloaliphatic or aromatic structure and at least two primary amino groups. The diamines can e.g. be ethylene diamine, propylene diamine, 1,4-butylene diamine, piperazine, 1,4-cyclohexyl dimethyl amine, hexamethylene 1,6-diamine, trimethyl hexamethylene diamine, methane diamine, isophorone diamine, 4,4'-diaminodicyclohexyl methane and aminoethyl ethanolamine. The following diamines are preferred: alkyl or cycloalkyl diamines such as propylene diamine or 1-amino-3-aminomethyl-3,5,5-trimethyl cyclohexane. The chain can also be prolonged with hydrazine. In addition to hydrazine, the chains can be prolonged with substituted hydrazides, e.g. monoalkyl or monoaryl hydrazide or bishydrazides such as adipic acid bishydrazide. The chain can also be prolonged with water.

The chain can be prolonged at least partly with a polyamine containing at least three amino groups with a reactive hydrogen atom. This type of polyamine can be used in a quantity such that after the polymer has been lengthened, unreacted amino nitrogen atoms with 1 to 2 reactive hydrogen atoms are present. Diethylene triamine, triethylene tetraamine, dipropylene triamine and dibutylene triamine are examples of such suitable polyamines. Alkyl or cycloalkyl triamines such as diethylene triamine are preferred polyamines. To prevent gelling during the prolongation of the chain, small proportions of monoamines such as ethyl hexyl amine can also be added.

Optionally the component d) can also be used to build up the binder component A). The quantities used are preferably 0 to 8 wt. %, preferably 0.5 to 6 wt. % relative to the solids in component A).

The hydrophilic structural component d) can be a compound containing ethylene oxide units incorporated in polyether chains, e.g.

d1) Diisocyanates and/or difunctional compounds as far as the isocyanate polyaddition reaction is concerned, containing hydrogen atoms reacting with isocyanate groups and with polyether side chains containing ethylene oxide units, or d2) Monoisocyanates and/or compounds which are monofunctional as regards the isocyanate polyaddition reaction and containing hydrogen atoms which react with isocyanate groups and contain polyether chains comprising ethylene oxide units, or mixtures of compounds d1) and d2).

The structural components d1) more particularly contain compounds having the general formula (I)

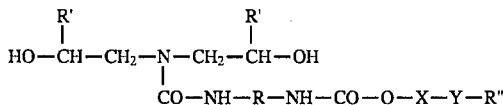

or compounds having the general formula (II)

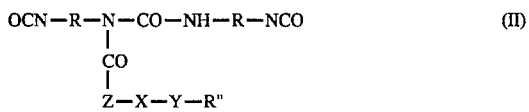

The compounds d2) more particularly contain those having the general formula (III)

or the formula (IV)

and/or compounds having the general formula (V)

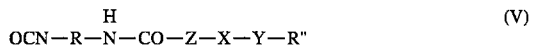

In formulae (I) to (V)

R stands for a divalent radical as obtained by removing the isocyanate groups from a diisocyanate of formula $R(NCO)_2$ of the aforementioned kind (in which case R will correspond to the previously-mentioned radical Q), R' stands for hydrogen or a monovalent hydrocarbon radical with 1 to 8 carbon atoms, preferably hydrogen or a methyl group, R" stands for a monovalent hydrocarbon radical with 1 to 12 carbon atoms, preferably an unsubstituted alkyl radical with 1 to 4 carbon atoms, X stands for the radical obtained by removing the terminal oxygen atom from a polyalkylene oxide chain with 5 to 90, preferably 20 to 70 links, at least 40% and preferably at least 65% of the links consisting of ethylene oxide, and the substances comprising propylene oxide, butylene oxide or styrene oxide units in addition to ethylene oxide units, propylene oxide units being preferred from among the last-mentioned list, Y stands for oxygen or —NR'"—, where R'" is as per its definition R", and Z stands for a radical corresponding in meaning to the definition Y.

These hydrophilic structural components (I) to (V) are produced by analogy with U.S. Pat. No. 3,920,598, U.S. Pat. No. 3,905,929, U.S. Pat. No. 4,190,566 or U.S. Pat. No. 4,237,264.

The component e) for producing the binder component A) is used in quantities of 1 to 12 wt. %, preferably 1.5 to 6 wt. %. The component e) is a compound containing at least one, preferably two H-active groups reacting with isocyanate groups and at least one group capable of forming anions. Hydroxyl groups and primary and/secondary amino groups are suitable for reacting with isocyanate groups. Carboxyl, sulphonic acid and/or phosphonic acid groups are capable of forming anions. Preferably carboxylic acid or carboxylate groups are used. They should be sufficiently inert for the isocyanate groups of the diisocyanate to react preferably with the hydroxyl groups of the molecule. Preferably alkanoic acids with two substituents on the carbon atom at α are used. The substituent can be a hydroxyl group, an alkyl group or an alkylol group. These polyols have at least one, usually one to three, carboxyl groups in the molecule. They have two to about 25, preferably 3 to 10 carbon atoms. Dihydroxyproprionic acid, dihydroxy succinic acid and dihydroxy benzoic acid are examples of such compounds. One particularly preferred group of dihydroxy alkanoic acids comprises α,α-dimethylol alkanoic acids, characterised by the structural formula

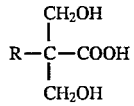

where R denotes hydrogen or an alkyl group with up to about 20 carbon atoms. 2,2-dimethylol acetic acid, 2,2- dimethylol propionic acid, 2,2-dimethylol butyric acid and 2,2-dimethylol pentanoic acid are examples of such compounds. The preferred dihydroxyalkanoic acid is 2,2-dimethylol propionic acid. The following are examples of compounds containing amino groups: α,δ-diaminovalerianic acid, 3,4-diaminobenzoic acid, 2,4-diaminotoluene sulphonic acid, and 2,4-diamino-diphenyl ether sulphonic acid. The polyol containing carboxyl groups can make up 3 to 100 wt. %, preferably 5 to 50 wt. % of the total polyol constituent in the NCO prepolymer.

The amount of ionisable carboxyl groups available in salt form by neutralisation of the carboxyl groups:

is usually at least 0.4 wt. %, preferably at least 0.17 wt. % relative to the solids. The upper limit is about 6 wt. %. The object of dihydroxyalkanoic acids in the non-neutralised prepolymer gives an acid number of at least 5, preferably at least 10. The upper limit of the acid number is about 60, preferably 40 relative to solids.

The quantity of component e) and the degree of neutralisation of the ionic groups incorporated with component e) is made such that the finally obtained polyurethane contains 0 to 120, preferably 1 to 80 milliequivalents of ionic groups per 100 g solids, the total quantity of ethylene oxide units and ionic groups within the stated ranges being such as to ensure that the polyurethane polyureas are dispersible in water.

The component A) in the binder used according to the invention has a number average molecular weight (Mn) of 70000 to 500000, preferably more than 80000, especially preferred more than 100000, preferably up to 300000.

The component B) of the binder used according to the invention is one or more polyurethanes having a number average molecular weight (Mn) of 20000 to 100000, preferably more than 30000, especially preferred more than 40000, preferably less than 90000 and especially preferred less than 80000.

The molecular weights are measured by gelpermeation chromatography in tetrahydrofurane in comparison with a polystyrene standard. The polyurethanes in component B) are obtainable by reacting the previously-defined components f), g), h) and i).

The component f) is used in a quantity of 10 to 40 wt. %, preferably 15 to 35 wt. % relative to the total solids in component B). Component f) is one or more organic polyisocyanates as previously described for the component a) for manufacturing the binder component A).

The component g) for producing the binder component B) is used in a quantity of 40 to 80 wt. %, preferably 45 to 75 wt. %, relative to the total solids in the binder component B). Component g) is one or more higher-molecular organic polyhydroxyl compounds, e.g. polyester diols. Polyester diols can be obtained e.g. by melting or azeotropic condensation at temperatures of e.g. 160° to 260° C. of organic dicarboxylic acids or anhydrides thereof and organic diols, or can be derived from a hydrocarboxylic acid or a lactone. The reaction can be continued, optionally with addition of catalysts such as tin octoate or dibutyl tin oxide, until practically all the carboxyl groups (acid number not exceeding 1) have reacted. The OH number is preferably 35 to 200, or particularly preferably above 50 and below 150. The molecular weights are e.g. 300 to 5000, preferably 500 to 5000, particularly preferably above 600 and below 3000.

The OH number and molecular weight are determined by the excess of alcohol used. The theoretical molecular weights can be calculated by determining the OH number allowing for a functionality of two in straight chains. The number average molecular weight can then be calculated from the formula $$Mn = \frac{56100}{OH\ number} \times 2$$

To obtain branched polyester polyols, small amounts of higher-valency polyols or polycarboxylic acids can be used. The dicarboxylic acids and diols can be straight-chain or branched aliphatic, cycloaliphatic or aromatic dicarboxylic acids or diols.

The diols for producing the polyesters are so constructed that the two OH groups are separated by a carbon chain of 2 to 14, preferably 4 to 8 C atoms. In the case of polyesters particularly resistant to hydrolysis, diols with sterically hindered primary OH groups or secondary hydroxyl groups are used. They consist e.g. of alkylene glycols, such as ethylene glycol, propylene glycol, butylene glycol, 1,4-butanediol, 1,6-hexanediol, neopentyl glycol or other diols such as dimethyl cyclohexane. The acid component of the polyester mainly consists of low-molecular dicarboxylic acids or their anhydrides with 2 to 30, preferably 4 to 18 carbon atoms in the molecule. The following are examples of suitable acids: o-phthalic acid, isophthalic acid, terephthalic acid, isophthalic acid and/or terephthalic acid substituted with alkyl groups, tetrahydrophthalic acid, cyclohexane dicarboxylic acid, succinic acid, adipic acid, azelaic acid, sebacic acid, maleic acid, fumaric acid, glutaric acid, hexachloroheptane dicarboxylic acid, tetrachlorophthalic acid and/or dimerised fatty acids. Instead of these acids, the anhydrides can be used, provided they exist. During the formation of polyester polyols, smaller quantities of carboxylic acids with three or more carboxyl groups, e.g. trimellitic acid anhydride or the adduct of maleic acid anhydride to unsaturated fatty acids can be present.

Use according to the invention can also be made of polyester diols obtained by reacting a lactone with a diol. They are characterised by the presence of a terminal hydroxyl group and repeating polyester components having the formula:

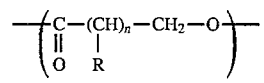

n is preferably 4 to 6 and the substituent R is hydrogen or an alkyl, cycloalkyl or alkoxy radical.

No substituent contains more than 12 carbon atoms. The total number of carbon atoms in the substituent does not exceed 12 per lactone ring. Examples thereof are hydroxy caproic acid, hydroxy butyric acid, hydroxy decanoic acid and/or hydroxy stearic acid. The lactone starting material can have the following general formula:

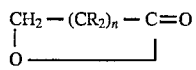

in which n and R have the meanings given previously. The unsubstituted ε-caprolactone in which n has the value 4 and all R substituents are hydrogen is preferred for producing the polyester diols. The reaction with lactone is started by low-molecular polyols such as ethylene glycol, 1,3-propane diol, 1,4-butane diol or dimethylol cyclohexane. However, other reaction components such as ethylene diamine, alkyl dialkanolamine or urea can be reacted with caprolactone.

The higher-molecular diols may also be polylactam diols produced e.g. by reacting ε-caprolactam with low-molecular diols.

The component h) optionally used for producing the binder component B) is preferably used in quantities of 0.2 to 18 wt. %, particularly preferably 0.5 to 10 wt. %, relative to the solids in component B). It is one or more low-molecular compounds as previously described as component c) for producing the component A). The aforementioned compounds can therefore be used as component h).

If the component i) is used to build up the binder component B), this is preferably done in quantities of up to 8 wt. %, particularly preferably quantities of 0.5 to 6 wt. % relative to the solids in component B). The compounds for component i) can e.g. be those already mentioned for component d) for building up the component A).

The component j) for producing the binder component B) is used in quantities of 1 to 12 wt. %, preferably 1.5 to 6 wt. % relative to the total solids in component B). It is one or more compounds as previously described as component e) for producing the binder component A). The compounds given for component e) can therefore be used e.g. as component j).

The polyurethane or polyurethane urea dispersions of components A) and B) can be produced by reacting the polyisocyanates, preferably diisocyanates, with the polyols of varying molecular weight, preferably diols, with simultaneous incorporation of diols or diamines, preferably diols with ionic groups, preferably carboxyl groups, in a part thereof. The reaction of the starting components can be in either one or more stages in mixed sequenced succession. The resulting products have a glass transition temperature of +50° C. to −50° C., preferably below 0° C. The components A) and B) of the dispersions must differ in chemical structure and in molecular weight.

In the reaction of the starting components a) to e) with f) to j), a solvent inert towards isocyanate groups and miscible with water can optionally be used, so that the reaction products are finally in the form of a colloidal solution in an aforementioned solvent. In this connection "solution" means both a true solution and a water-in-oil emulsion, which may be produced e.g. if some of the structural components are in the form of aqueous solutions. The following are examples of suitable solvents: acetone, methyl ethyl ketone, N-methyl pyrrolidone or any mixtures of these solvents. The amount of solvent is usually such that 10 to 70 wt. % solutions of the reaction products are obtained from the starting components a) to e) in the solvent.

When polyurethane polyureas are produced in one stage, the starting components are preferably mixed with groups capable of reacting with isocyanate groups and reacted with the starting components having isocyanate groups, preferably initially in the absence of solvents and at temperatures at 50° to 150° C., optionally with known catalysts. Preferably the nature and proportions of the starting compounds are chosen to obtain an equivalent ratio of isocyanate groups to groups reacting with isocyanate groups of 0.8:1 to 1.05:1.

During the reaction the viscosity of the mixture increases, so that one of the aforementioned solvents is gradually added to the mixture. Finally an organic solution of the completely reacted polyurethane is obtained, the concentration being adjusted to about 10 to 70, particularly 15 to 55 wt. % solids.

In the preferred two-stage process, preferably an NCO prepolymer is first produced in the melt of starting components a) and optionally d) containing excess quantities of isocyanate groups and starting components b), c), e) and optionally d) containing hydroxyl groups, maintaining an NCO—OH equivalent ratio of 1.1:1 to 3.5:1, preferably 1.2:1 to 2.5:1 in the presence or absence of a solvent of the aforementioned kind at about 50° to 150° C., the NCO polymer being subsequently absorbed in a solvent of the aforementioned kind, if solvents have been absent. The resulting solution is then reacted with other chain-prolonging or cross-linking agents c), optionally in the form of aqueous solutions, the components c) preferably being structural components of the kind mentioned hereinbefore by way of example and containing primary and/or secondary amino groups. The amount of structural components c) used in this second stage is made such that the equivalence ratio of all starting compounds used in the first and second stage corresponds to the previously-given information.

In both variants (single-stage or two-stage), the resulting solutions of the reaction products in the aforementioned solution have a content of solids within the aforementioned ranges.

At least partial conversion of optional potential ionic groups into ionic groups by quaternisation or neutralisation is advantageously brought about before the dispersing water is added. In the preferred case where structural components e) comprising carboxyl groups are used, particularly dimethylol propionic acid, the neutralising agents are preferably tertiary amines. The neutralisation agent is added either in the form of the salt, e.g. the dimethylol propionic acid salt, or after the production of the isocyanate prepolymer. Examples of such tertiary amines are triethylamine, tri-n-butylamine, N,N,N-trimethyl cyclohexylamine, N-methyl morpholine, N-methyl piperazine, N,N-dimethyl ethanolamine, N-methyl piperidine or triethanolamine. It is also preferable, under the conditions set out in EP-A-269 972 (U.S. Pat. No. 4,764,553), to use ammonia as a neutralisation agent for previously-incorporated carboxyl groups.

After the water serving as a solvent or dispersing medium has been added, the amount usually being such that 10 to 60, preferably 20 to 45 wt. % dispersions are obtained, at least the major proportion of the auxiliary solvent is optionally removed by distillation.

The polyurethane polyureas can also be manufactured by other variants in the prior art, e.g. by using hydrazine or diamine in blocked form, i.e. in the form of the corresponding azines or ketimines, as the chain-prolonging agent c), as taught in U.S. Pat. No. 4,269,748 or U.S. Pat. No. 4,829,122.

In addition the "prepolymer mixing process" can be used (see D. Dieterich, Angew, Makromol, Chem, 98, 142 (1981) ), an NCO prepolymer first being produced in the previously-described manner and then being mixed with water to form an emulsion, after at least partial conversion of any potential ionic groups into ionic groups. The NCO groups of the prepolymer are then reacted in the aqueous phase, by adding amine chain-prolonging or cross-linking agents c) and/or by reaction with water.

The coating agents according to the invention contain 8 to 30 wt. %, relative to the total coating agent, of the binder containing components A) and B). Preferably the components A) and B) are chosen so that the sum of their glass transition temperatures (Tg) is at about 20° C. or above.

The water content of the coating agent according to the invention is 50 to 85 wt. %, preferably 60 to 80 wt. %, in each case relative to the total coating agent. The water content depends on the respective form sold and/or applied. For example the water content can be up to 70 wt. % and can be increased to up to 85% before application.

To improve the flow properties, the coating agents according to the invention can contain 1 to 20 wt. %, preferably 8 to 15 wt. %, in each case relative to the total coating agent, of one or more solvents. The solvents can be organic solvents conventionally used in the lacquer sector as lacquer solvents and/or additives to aqueous coating agents. Aromatic solvents such as xylene, esters such as butyl acetate, ethers such as ethylene glycol monobutyl ether (butyl glycol) and alcohols are suitable e.g. n-butanol, or hydrocarbons such as benzine (the latter optionally added in small quantities).

The coating agents according to the invention can be manufactured in conventional manner by mixing the components. For example the aqueous dispersions of components A) and B) can be mixed after preparation and combined with the other additives. Mixing can be done in conventional mixers such as agitator units. Elevated temperatures can be used, e.g. from room temperature to about 90° C.

Alternatively the aqueous coating agents can be manufactured by mixing the optionally partly reacted preproducts of components A) and B) and reacting them together, e.g. by prolonging the chain, to obtain the finished dispersions.

Preferably components A) and B) are mixed so that the glass transition temperature of the mixed resin is about 20° C. or above.

The coating agents according to the invention are particularly suitable for producing metallic coatings. Optionally they can be used without metallic pigments, however. In the case of metallic pigments, preferably 0.3 to 4 wt. % of one or more metallic pigments, relative to the total coating agent, is used. The metallic pigments can be conventional metal platelets or metal flake pigments, such as metal bronzes, e.g. aluminium pigments such as aluminium bronze.

The coating agents according to the invention can contain one or more pigments in addition to or instead of the metallic pigments. In the case of addition to metallic pigments, the other pigments are preferably in proportions of 0.2 to 10 wt. %, particularly preferably 0.5 to 6 wt. % relative to the total coating agent. If metallic-free coating agents are formulated, particularly suitable for manufacturing single-colour lacquers, the amount of added pigments is preferably 2 to 30 wt. %, particularly preferably 3 to 20 wt. % relative to the total coating agent. The pigments can be colouring, transparent or decorative pigments. They can be soluble or insoluble. The pigments are conventional inorganic or organic pigments, including white pigments such as titanium dioxide. The decorative pigments can e.g. be pearlescent pigments such as iriodine pigments. The pigments also include conventional inorganic or organic fillers as known to the skilled addressee in the lacquer sector.

The coating agents according to the invention contain neutralising agents for partly neutralising the neutralisable groups. The degree of neutralisation of neutralisable groups is preferably 40 to 120% of the neutralisable groups, preferably below 100%.

The neutralisation agents for acid groups can be bases conventionally used in the lacquer sector, e.g. the previously-mentioned amines, ammonia or alkanolamines such as N,N-dimethyl ethanolamine.

The coating agents according to the invention optionally contain conventional additives and adjuvants as used in the lacquer sector. These adjuvants and additives are e.g. thickeners, additives affecting the flow properties, antifoaming agents or corrosion inhibitors (e.g. for inhibiting the gassing of metal pigments, Al gasification. The additives and adjuvants are added in conventional quantities known to the skilled addressee, depending on the desired effect.

The coating agents according to the invention can be applied to various substrates by conventional methods, e.g. by spraying, spreading or doctor blades. The substrates can be of various materials such as metals, plastics, wood, glass or other substrates. The coatings according to the invention are particularly suitable for producing lacquers with metal effects, or for producing single-colour lacquers.

The coating agents according to the invention are physically drying, i.e. they do not need stoving and can be dried e.g. at temperatures of up to about 20° to 60° C.

The coating agents according to the invention, after being applied, can be coated with covering lacquers, more particularly transparent covering lacquers. The covering lacquers can be applied wet-in-wet, after short ventilation or after drying the base layer of lacquer applied according to the invention. The covering lacquer can be dried at the same time as the layer of coating agent according to the invention. The covering lacquer can be a conventional, more particularly transparent lacquer, e.g. of the kind conventionally used in the car sector. The lacquers are mainly solvent-based, but water-based covering lacquers can be used.

As already mentioned, the coating agents according to the invention can be applied to a wide variety of substrates. They are particularly suitable for producing metallic-base layers and single-colour base layers in multilayer composite lacquers. The preferred application is to lacquering of motor vehicles or parts thereof. As a result of the advantageous physical drying, the coating agents according to the invention are particularly suitable as repair or patching lacquers.

The following examples illustrate the invention:

EXAMPLE OF MANUFACTURE 1

Polyurethane-polyurea Dispersion A 850 parts of a polycarbonate from 1,6-hexanediol (prepared by reaction of 1,6-hexanediol and diphenyl carbonate; hydroxyl number 56, molecular weight about 2000), 67.5 parts of a monofunctional polyether alcohol, OH number 26, prepared by alkoxylation of n-butanol using a mixture of 83% ethylene oxide and 17% propylene oxide, 21.4 parts of 2,2-bishydroxymethyl propionic acid (DMPS) and 22.5 parts of 1,4-butanediol were reacted at 100° C. with a mixture of 151.2 parts of 1,6-diisocyanatohexane (HDI) and 199.8 parts of 3-isocyanatomethyl-3,5,5-trimethylcyclohexyl isocyanate (IPDI), yielding a prepolymer containing about 5% of free isocyanate groups. The prepolymer was dissolved in 2440 parts of acetone and the solution was cooled to 50° C.

A solution of 19.8 parts ethylene diamine and 7.5 parts hydrazine hydrate was prepared in 500 parts of water. The solution was slowly added, with vigorous agitation, to the prepolymer solution, producing a thinly liquid cloudy white solution. Next, 13.4 parts of N,N-dimethyl ethanolamine were added. 1525 parts of deionised water were then added with vigorous agitation, resulting in an opaque blue-white dispersion of the solids. The acetone was removed from the dispersion by distillation in vacuo, leaving a pure aqueous dispersion containing 40% solids.

The solids in the dispersion contain the following: (mEq-%=milliequivalent % per 100 g solids).

410 mEq-% carbonate groups (—O—CO—O—)
148 mEq-% urethane groups (—NH—CO—O—)
95 mEq-% urea groups (—NH—CO—NH—)
243 mEq-% urethane and urea groups

EXAMPLE OF MANUFACTURE 2

Aqueous Polyurethane Dispersion B 250 g of straight-chain polymer (made up of adipic acid, isophthalic acid, hexanediol; OH number 77, acid number 10) were heated with 80 g methyl ethyl ketone and 53.3 g N-methyl pyrrolidone to 70° C. in a reaction vessel with an agitator, internal thermometer, heating and reflux condenser and 74 g of hydrogenated bisphenol A and 28.3 g dimethylol propionic acid were added at the same temperature. The batch was heated to 120° C. and agitated at the same temperature for half an hour. 146.7 g of hexamethylene diisocyanate was then added at 70° C. After an exothermic phase (temperature<90° C.) the batch was kept at 75° C. until the residual isocyanate numerical values were below 1.8. The hot resin mixture was dispersed in 891 g deionised water and 23.5 g triethylamine with vigorous agitation. Five minutes after adding the resin, 10.5 g of 1,3-propylene diamine in 75 g deionised water were added and the batch was agitated for a further hour.

The result was a transparent aqueous dispersion with the following parameters:

| | |
|---|---|
| Content of solids: | 30% |
| Viscosity (20° C.): | 109 mPa · s |
| pH: | 9.8 |
| Acid number: | 27 (mg KOH per g solids) |
| Mn: | 34 000 |

COMPARATIVE TEST

Manufacture of a Dispersion C According to EP-A-0 089 497

1105 g of a straight-chain polymer (formed from adipic acid, isophthalic acid and hexanediol with an OH number of 102) was heated to 90° C. in a reaction vessel with agitator, internal thermometer, heating and reflux condenser and 1.8 g of trimethylol propane and 393 g of isophorone diisocyanate were added at the same temperature. The temperature was maintained until the NCO number was 3.8. After cooling to 60° C. a solution of 25.3 g dimethylol propionic acid, 18.1 g triethylamine and 250 g N-methyl pyrrolidone was added. After heating to 90° C. and holding for 1 hour, an NCO number of 0.5 was obtained. The product was immediately agitated in 853 g of deionised water and a mixture of 2.4 g ethylene diamine and 104 g water was added in 20 minutes.

| | |
|---|---|
| Content of solids: | 33.7 wt. % (30 min 150° C. in circulating-air oven) |
| Acid number: | 15 (mg KOH per g solid resin) |
| MEQ value: | 20.9 |
| pH: | 7.7 |

Average particle size: 123 nmm

Number average molecular weight: Mn>130 000

EXAMPLE OF MANUFACTURE 3

Manufacture of Metallic Water-based Lacquers

Aqueous metallic-based lacquers were prepared from the previously-obtained dispersions A to C and had the following constituents:

| | |
|---|---|
| 35.5[x)] | parts of dispersions A to C |
| 46.1[x)] | parts water |
| 4.8 | parts n-butanol |
| 5.3 | parts butyl glycol |
| 1.6 | parts N-methyl pyrrolidone |
| 0.3 | parts of a commercial corrosion inhibitor for preventing gassing of aluminium |
| 2.1 | parts of a commercial thickener |
| 0.2 | parts of N,N-dimethyl ethanolamine |
| 4.1 | parts of a commercial aluminium paste, 60% Al |

[x)]Each dispersion contained about 40% solids (FK); when the FK was lower, the amounts of dispersion and water were suitably adjusted, so as to obtain coating materials suitable for use and with the same FK content in each case.

The resulting metallic base lacquers had a viscosity of about 30 sec. (DIN beaker, 4 mm nozzle, 23° C.) and were diluted to obtain a spray viscosity of about 20 sec with about 20% water.

The dispersions were used to produce lacquers as follows:

Structure of lacquer coating on the metal sheets under test:
  Bright-ground car-body metal
  Conventional 2K-epoxy adhesive primer
  Conventional 2K-PU filler
  Water-based lacquer
  Conventional 2K-PU clear lacquer, medium solid type FK 47%

Application and drying of the covering lacquer layer (base lacquer+clear lacquer):

Water-based lacquer sprayed as in Examples 1 to 4 in the following table 40 minutes pre-drying at room temperature Application of clear lacquer by spraying 10 minutes ventilation at room temperature 45 minutes drying at 60° C.

Explanations:
  Parts=parts by weight
  2K=two components
  PU=polyurethane

The properties of the resulting lacquer coatings are shown in the following table.

| | | Comparative test on metallic base lacquer | | | |
|---|---|---|---|---|---|
| Example | Binder | Hardness before/after F/W | Adhesion before/after F/W | Bulk/gloss after F/W | Metallic effect (Flop) |
| 1 | Dispersion: Component A | 2/2–3 | ½ | 2–3 | 2–3 |
| 2 | Dispersion: | 2–3/3 | ½ | 3 | 3 |

Comparative test on metallic base lacquer (continued)

| Example | Binder | Hardness before/after F/W | Adhesion before/after F/W | Bulk/gloss after F/W | Metallic effect (Flop) |
|---|---|---|---|---|---|
| 3 | Component B Mixture of components A + B according to the invention | 2/2– | ½ | 2 | 2 |
| 4 | Comparative test Dispersion C | 2–3/3 | 2/2–3 | 3 | 2–3 |

F/W = Resistance to water of condensation DIN 50017 KK 72h
Remarks; 1 = very good, 2 = good, 3 = useful to some extent, 4 = useless
Adhesion: Grid method, DIN 53151

EXAMPLE OF MANUFACTURE 4

Manufacture of Single-colour Water-based Lacquers

The previously-manufactured dispersions A to C were used to produce aqueous single-colour based lacquers having the following constituents:

| | |
|---|---|
| 34.5[x)] | parts of dispersions A to C |
| 21.1[x)] | parts water |
| 12.1 | parts butyl glycol |
| 1.3 | parts of a commercial thickener |
| 0.14 | parts of N,N-dimethyl ethanolamine |
| 22.1 | parts of a commercial titanium dioxide pigment |
| 0.5 | parts of a commercial copper phthalocyanine pigment |
| 0.16 | parts of a commercial foam-breaking agent |
| 8.1 | parts of a commercial PU grinding aid (FK 30%). |

[x)]Applies to dispersions containing about 40% FK; when the FK was lower the amounts of dispersion and water were suitably adjusted, to obtain coating agents ready for use and with the same FK content in each case.

The resulting single-colour based lacquers had a viscosity of about 40–50 sec. (DIN beaker 4 mm nozzle, 23° C.) and were diluted to obtain a spray viscosity of about 20 sec. with about 10–15% water.

We claim:

1. A physically drying water-based coating composition containing:
   8 to 30 wt. % of a binder composition comprising a mixture of components A) and B) wherein said components are:
   A) 10 to 90 wt. % of at least one polyurethane containing carbonate groups and having a number average molecular weight of 70,000 to 500,000, in the form of an aqueous dispersion, and
   B) 90 to 10 wt. % of a polyurethane containing carboxylic acid ester groups and having a number average molecular weight of 20,000 to 100,000, in the form of an aqueous dispersion,
   wherein the percentages by weight of the binder components A) and B) are based on binder solids and add to 100 wt. %, and wherein the number average molecular weights of components A) and B) are different such that the number average molecular weight of Component A) is greater than the number average molecular weight of Component B),
   C) 50 to 85 wt. % water,
   D) 1 to 20 wt. % of a solvent,
   E) 0.3 to 4 wt. % of a metallic pigment,
   F) 0 to 10 wt. % of a colouring pigment, and
   G) a neutralization agent in an amount sufficient to produce a neutralization degree of 40 to 120% in the neutralizable groups of the binder composition,
   wherein said component A) of the binder composition being obtained by reaction of:
   a) 10 to 40 wt. % of an organic polyisocyanate component characterized by the absence of hydrophilic groups or groups convertible into hydrophilic groups,
   b) 40 to 80 wt. % of a high-molecular weight organic polyhydroxyl compound characterized by the absence of hydrophilic groups or groups convertible into hydrophilic groups and comprising at least 50 wt. % polyhydroxyl polycarbonate,
   c) 0 to 18 wt. % of water or a low-molecular weight compound containing at least two groups capable of reacting with isocyanate groups and characterized by the absence of hydrophilic groups or groups convertible into hydrophilic groups,
   d) 0 to 8 wt. % of a non-ionic hydrophilic compound containing at least one isocyanate group or at least one group capable of reacting with isocyanate groups, and
   e) 1 to 12 wt. % of a compound containing at least one ionic group or at least one group convertible into an ionic group and at least one hydrogen atom capable of reacting with isocyanate groups,
   and wherein said component B) of the binder composition being obtained by reaction of:
   f) 10 to 40 wt. % of an organic polyisocyanate characterized by the absence of hydrophilic groups or groups convertible into hydrophilic groups,
   g) 40 to 80 wt. % of a high-molecular weight organic polyhydroxyl compound characterized by the absence of hydrophilic groups or groups convertible into hydrophilic groups,
   h) 0 to 18 wt. % of water or a low-molecular weight compound containing at least two groups capable of reacting with isocyanate groups and characterized by the absence of hydrophilic groups or groups convertible into hydrophilic groups,
   i) 0 to 8 wt. % of a non-ionic hydrophilic compound containing an isocyanate group or a group capable of reacting with isocyanate groups, and
   j) 1 to 12 wt. % of a compound containing at least one ionic group or at least one group convertible into an ionic group and at least one hydrogen atom capable of reacting with isocyanate groups,
   wherein said physically drying water-based coating composition is curable at about 20° to 60° C.

2. A physically drying water-based coating composition according to claim 1, wherein components A) and B) of the binder composition are polyurethane ureas.

3. A physically drying water-based coating composition according to claim 1, wherein said binder composition has a glass transition temperature of about 20° C. or above.

4. A method of preparing a physically drying coating composition including a binder composition of components A) and B), wherein component A) is a polyurethane containing a carbonate grouping and having a number average molecular weight of 70,000 to 500,000 in the form of an aqueous dispersion, and wherein component A) is produced by reacting:

a) 10 to 40 wt. % of an organic polyisocyanate which does not contain any hydrophilic groups or groups convertible into hydrophilic groups, b) 40 to 80 wt. % of a high-molecular weight organic polyhydroxyl compound which does not contain any hydrophilic groups or groups convertible into hydrophilic groups and comprising at least 50 wt. % of a polyhydroxyl polycarbonate, c) 0 to 18 wt. % of water or a low-molecular weight compound containing at least two functional groups which are capable of reacting with isocyanate groups and which does not contain hydrophilic groups or groups convertible into hydrophilic groups, d) 0 to 8 wt. % of a non-ionic hydrophilic compound containing an isocyanate group or a group reactive with isocyanate groups, and e) 1 to 12 wt. % of a compound containing an ionic group or a group convertible into an ionic group and a hydrogen atom reactive with isocyanate groups, and wherein component B) is a polyurethane containing carboxylate acid ester groups and having a number average molecular weight of 20,000 to 100,000, in the form of an aqueous dispersion, and wherein component B) is produced by reacting:

f) 10 to 40 wt. % of an organic polyisocyanate which does not contain hydrophilic groups or groups convertible into hydrophilic groups, g) 40 to 80 wt. % of a high-molecular weight organic polyhydroxyl compound which does not contain hydrophilic groups or groups convertible into hydrophilic groups, h) 0 to 18 wt. % of water or a low-molecular weight compound containing at least two groups capable of reacting with isocyanate groups and which does not contain hydrophilic groups or groups convertible into hydrophilic groups, i) 0 to 8 wt. % of a non-ionic hydrophilic compound containing at least one isocyanate group or at least one group capable of reacting with isocyanate groups, and j) 1 to 12 wt. % of a compound containing at least one ionic group or a group convertible into an ionic group and having at least one hydrogen atom capable of reacting with isocyanate groups, wherein said physically drying coating composition is prepared by forming a binder composition containing 10 to 90 wt. % of component A) and 90 to 10 wt. % of component B), the percentages by weight based on the weight of solids of components A) and B) adding to 100 wt. %, and then admixing 8 to 30 wt. % of said binder composition with:
 50 to 85 wt. % water,
 1 to 20 wt. % of a solvent,
 0.3 to 4 wt. % of a metallic pigment,
 0 to 10 wt. % of a colouring or decorative pigment, and
 a neutralizing agent for obtaining a neutralization degree of 40 to 120% in the neutralizable groups of the binder composition;

wherein components A) and B) of said binder composition have different number average molecular weights such that the number average molecular weight of Component A) is greater than the number average molecular weight of Component B) and wherein said physically drying coating composition is curable at about 20° to 60° C.

5. A physically drying water-based coating composition as defined in claim 1, wherein the number average molecular weight of component A) is between about 80,000 to 300,000 and wherein the number average molecular weight of component B) is between about 30,000 and 90,000.

6. A physically drying water-based coating composition as defined in claim 2, wherein the number average molecular weight of component A) is between about 80,000 to 300,000 and wherein the number average molecular weight of component B) is between about 30,000 and 90,000.

7. A physically drying water-based coating composition as defined in claim 5, wherein the number average molecular weight of component A) is between about 100,000 to 300,000 and wherein the number average molecular weight of component B) is between about 40,000 and 80,000.

8. A physically drying water-based coating composition as defined in claim 6, wherein the number average molecular weight of component A) is between about 100,000 to 300,000 and wherein the number average molecular weight of component B) is between about 40,000 and 80,000.

9. A physically drying water-based coating composition as defined in claim 1, wherein said physically drying water-based coating composition is curable at about room temperature.

10. A physically drying water-based coating composition as defined in claim 2, wherein said physically drying water-based coating composition is curable at about room temperature.

11. A physically drying water-based coating composition as defined in claim 5, wherein said physically drying water-based coating composition is curable at about room temperature.

12. A physically drying water-based coating composition as defined in claim 6, wherein said physically drying water-based coating composition is curable at about room temperature.

13. A physically drying water-based coating composition as defined in claim 7, wherein said physically drying water-based coating composition is curable at about room temperature.

14. A physically drying water-based coating composition as defined in claim 8, wherein said physically drying water-based coating composition is curable at about room temperature.

15. A method as defined in claim 4, wherein the number average molecular weight of component A) is between about 80,000 to 300,000 and wherein the number average molecular weight of component B) is between about 30,000 and 90,000.

16. A method as defined in claim 15, wherein the number average molecular weight of component A) is between about 100,000 to 300,000 and wherein the number average molecular weight of component B) is between about 40,000 and 80,000.

17. A method as defined in claim 4, wherein said physically drying coating composition is curable at about room temperature.

18. A method as defined in claim 15, wherein said physically drying coating composition is curable at about room temperature.

19. A method as defined in claim 16, wherein said physically drying coating composition is curable at about room temperature.

* * * * *